(12) United States Patent
Goldfarb et al.

(10) Patent No.: US 9,599,248 B2
(45) Date of Patent: Mar. 21, 2017

(54) DIRECTIONAL CONTROL VALVE WITH SPOOL DELAY MECHANISM

(71) Applicant: VANDERBILT UNIVERSITY, Nashville, TN (US)

(72) Inventors: Michael Goldfarb, Nashville, TN (US); Jason Mitchell, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 14/758,317

(22) PCT Filed: Dec. 31, 2013

(86) PCT No.: PCT/US2013/078442
§ 371 (c)(1),
(2) Date: Jun. 29, 2015

(87) PCT Pub. No.: WO2014/106236
PCT Pub. Date: Jul. 3, 2014

(65) Prior Publication Data
US 2015/0330527 A1 Nov. 19, 2015

Related U.S. Application Data

(60) Provisional application No. 61/747,673, filed on Dec. 31, 2012.

(51) Int. Cl.
| | | |
|---|---|---|
| *F16K 31/06* | (2006.01) | |
| *F16K 1/12* | (2006.01) | |
| *F16K 31/383* | (2006.01) | |
| *F16K 47/00* | (2006.01) | |
| *F16K 29/00* | (2006.01) | |
| *F16K 11/07* | (2006.01) | |
| *F15B 13/04* | (2006.01) | |
| *F16K 31/363* | (2006.01) | |

(52) U.S. Cl.
CPC .......... *F16K 31/0689* (2013.01); *F16K 1/123* (2013.01); *F16K 11/07* (2013.01);
(Continued)

(58) Field of Classification Search
CPC ...... F16K 31/0689; F16K 47/00; F16K 1/123; F16K 31/363; F16K 31/383; F16K 11/07;
(Continued)

(56) References Cited

U.S. PATENT DOCUMENTS 2,916,019 A * 12/1959 Murphy .............. F15B 13/0402
137/625.48
3,892,291 A * 7/1975 Acker ..................... F16N 25/02
137/625.6
(Continued)

FOREIGN PATENT DOCUMENTS

DE 102 47 967 2/2004
DE 10 2011 00260 7/2012
(Continued)

OTHER PUBLICATIONS

Giesen, "[Energy-Savings Pneumatics: opportunities in control technology for reducing the consumption in linear drives]", *Fluid*, Jun. 1982, pp. 36-39. German.
(Continued)

*Primary Examiner* — Atif Chaudry
(74) *Attorney, Agent, or Firm* — Parker Highlander PLLC

(57) ABSTRACT

A mechanism for implementing a delay in a directional control valve in the movement of a valve spool within a valve body from a first position of the spool to a second position of the spool.

8 Claims, 4 Drawing Sheets

(52) U.S. Cl.
CPC .......... *F16K 29/00* (2013.01); *F16K 31/0613* (2013.01); *F16K 31/363* (2013.01); *F16K 31/383* (2013.01); *F16K 47/00* (2013.01); *F15B 13/0402* (2013.01); *F15B 13/0407* (2013.01); *F15B 2211/30525* (2013.01); *F15B 2211/329* (2013.01); *F15B 2211/7053* (2013.01); *Y10T 137/7762* (2015.04); *Y10T 137/8663* (2015.04); *Y10T 137/8671* (2015.04); *Y10T 137/86582* (2015.04); *Y10T 137/86879* (2015.04)

(58) Field of Classification Search
CPC ......... Y10T 137/7762; Y10T 137/8671; Y10T 137/8663; Y10T 137/86582; F15B 13/0402; F15B 2211/30525; F15B 2211/329; F15B 2211/7053
See application file for complete search history.

(56) References Cited

U.S. PATENT DOCUMENTS

| | | | | |
|---|---|---|---|---|
| 4,527,502 A | * | 7/1985 | Schmitt | F41F 3/10 |
| | | | | 114/238 |
| 4,886,091 A | * | 12/1989 | Coleman | F15B 13/044 |
| | | | | 137/625.65 |
| 5,377,719 A | * | 1/1995 | Gyllinder | F01L 25/063 |
| | | | | 137/625.63 |
| 6,364,280 B1 | * | 4/2002 | Stach | F15B 13/0402 |
| | | | | 137/625.69 |
| 2002/0007857 A1 | | 1/2002 | Lou | |
| 2005/0133099 A1 | | 6/2005 | Ino et al. | |
| 2013/0174915 A1 | * | 7/2013 | Tondolo | G05D 7/0617 |
| | | | | 137/2 |

FOREIGN PATENT DOCUMENTS

| | | |
|---|---|---|
| EP | 1 323 963 | 7/2003 |
| EP | 1 580 469 | 9/2005 |

OTHER PUBLICATIONS

Giesen, "[Energy-Savings Pneumatics: opportunities in control technology for reducing the consumption in linear drives]", *Fluid*, Jun. 1982. English Translation.

International Preliminary Report on Patentability issued in International Application No. PCT/US2013/078442, mailed Jul. 9, 2015.

International Search Report and Written Opinion issued in International Application No. PCT/US2013/078442, mailed Apr. 15, 2014.

* cited by examiner

SECTION A-A

SECTION B-B

(12) United States Patent

DIRECTIONAL CONTROL VALVE WITH SPOOL DELAY MECHANISM

CROSS REFERENCE TO RELATED APPLICATIONS

This application is a national phase application under 35 U.S.C. 371 of International Application No. PCT/US2013/078442, filed Dec. 31, 2013, which claims priority to U.S. Provisional Patent Application Ser. No. 61/747,673, filed Dec. 31, 2012, the contents of each of which are incorporated by reference herein.

TECHNICAL FIELD

The present disclosure relates generally to directional-control valves. The present disclosure relates more specifically to three-position directional-control valves with a delay mechanism employed within the spool to slow the movement of the spool as it passes through the central spool position.

BACKGROUND INFORMATION

A typical directional-control valve is comprised of a valve spool that slides linearly within a valve body. The valve spool is comprised of a discrete number of lobes, typically three, while the valve body is comprised of a discrete number of internal and external ports, typically five. As the valve spool slides linearly through the valve body, various ports in the valve body are covered or exposed by the lobes of the valve spool, which in effect provides various configurations of connectivity between the ports in the valve body. The valve spool of a typical directional-control valve incorporates three lobes, while the valve body of a typical directional-control valve incorporates five ports, which correspond to four distinct fluid ports, which are the supply (S), exhaust (E), and first and second actuator ports (A and B, respectively). When the valve spool is in the first position (P1), the inlet port (S) is in fluid communication with the second actuator port (B), and the exhaust port (E) is in fluid communication with the first actuator port (A). When the valve spool slides to the second position (P2), the inlet port (S) is in fluid communication with the first actuator port (A), and the exhaust port (E) is in fluid communication with the second actuator port (B). These are the two fundamental positions of a directional-control valve, and valves that provide these two positions (P1 and P2) exclusively are called two-position directional-control valves.

In a two-position valve, the valve spool is commonly (though not universally) moved within the valve body between the first and second spool positions by a single solenoid actuator. The solenoid actuation can either be configured to be a direct-acting type, in which a solenoid actuator exerts a motive force directly on the valve spool, or of the pilot-actuated type, in which the solenoid actuator controls a pilot valve, which in turn controls the flow of a pressurized fluid, which in turn exerts motive force on the valve spool. The latter is in effect a mechanism of force amplification.

In the case of a two-position valve, the valve is often actuated by a single solenoid actuator. In the direct-acting type, energizing the solenoid actuator pushes the spool directly into the first position, while de-energizing the solenoid allows a return spring (or a similar return mechanism) to push the spool back to the second spool position. In the pilot-operated type, energizing the solenoid typically opens a pilot valve, which in turn enables a supply of pressurized fluid to fill a small cylinder adjacent to the spool and push the spool into the first position. De-energizing the solenoid de-pressurizes the pilot cylinder and allows a return spring, a source of pressurized fluid, or a similar return mechanism, to push the spool back to the second spool position.

In some embodiments of a directional-control valve, the valve includes a third position of the spool within the valve body, which is physically located in an intermediate position approximately halfway between the first and second positions of the spool relative to the valve body. The third position is characterized by a different type of fluid connectivity relative to the first and second positions. For example, in the third position, all inlet and actuator ports might be isolated (i.e., none of the four ports are in fluid communication with each other), or both actuator ports might be connected to an exhaust port. Valves that provide the two fundamental positions, in addition to a third intermediate position, are called three-position directional-control valves.

In the case of a typical three-position valve, the valve is actuated by a pair of opposing solenoid actuators, such that energizing one solenoid while de-energizing the other moves the spool into the first position; reversing this pattern moves the spool into the second position; and de-energizing both solenoids allows a pair of centering springs to move the spool to the third, intermediate position. A pilot-operated valve operates similarly.

SUMMARY

This application describes exemplary embodiments for constructing a single-solenoid directional control valve for specialized applications in which a third spool position is desired momentarily, when the spool is moved between the first and second spool positions. Specifically, in some applications, one may wish to employ a three-position valve rather than a two-position valve. Further, in some applications, the third spool position may be employed in a manner such that the valve spool remains in the third position only momentarily, when moving between the first and the second spool positions. Further, in these applications, it may be preferable to employ a single solenoid rather than double solenoid, for example, to reduce the cost of the valve.

Specifically, one possible manner of implementing a momentary pause (or dwell) in the third position while the spool is in transit between the first and second positions is to utilize a typical three-position valve spool actuation architecture, which typically incorporates a pair of solenoid actuators configured in opposition. The respective energizing of each solenoid forces the valve spool into the first and second position, respectively, while de-energizing both allows a set of centering springs to move the valve spool to the third (center) position. As such, one could implement a momentary dwell in the third position electronically, by momentarily de-energizing both solenoids between the alternate energizing and de-energizing of each corresponding to the first and second spool positions. This implementation, however, may entail increased cost relative to a single-solenoid embodiment. Therefore in such applications, it may be preferable to implement this third-position dwell with a valve actuated by a single-solenoid. Exemplary embodiments described herein can enable the spool to dwell for a short period of time in a third intermediate position with a single-solenoid implementation. In specific embodiments, a method of providing the aforementioned third-position dwell functionality is accomplished by combining a single solenoid actuator with a physically (rather than electronically) implemented dwell.

Third Position Spool Delay Mechanism

Exemplary embodiments of a dwell mechanism can include several design features. For example, the dwell mechanism can reside within the valve spool, such that the mechanism does not alter the external geometry of the valve spool, or the functional interface between the valve spool and valve body. In addition, exemplary embodiments of the mechanism should not be subject to significant wear, and similarly should not change significantly the dwell characteristics over the life-cycle of the valve. Furthermore, exemplary embodiments should be capable of concentrating the dwell in the third spool position, rather than distributing the dwell throughout the region of linear travel of the spool between the first and second spool positions. Specifically, although a three-position directional-control valve provides three distinct port connectivity configurations (each associated with one of the three spool positions), the spool/body interface of a three-position valve contains five distinct regions of fluid connectivity.

In particular, each of the three port connectivity configurations should be separated by a region in which all inlet and outlet ports are isolated. For example, since the configuration of fluid connectivity cannot instantly change, in order to avoid unwanted connectivity between ports, the spool moves through a region in which all ports are temporarily isolated. This behavior is analogous to "break-before-make" behavior in an electrical switch, which avoids potential electrical short circuits during the process of switching. As such, a three-position directional-control valve contains the following five distinct regions of operation, corresponding to the position of the spool within the valve body: the first, second, and third positions previously described, wherein the third position is located between the first and second; and a fourth and fifth position, located respectively between the first and third and between the second and third positions, and corresponding to a fluid connectivity in which all ports are in fluid isolation.

For applications in which the valve spool should dwell for a short period in the third (i.e., central) position, the valve spool should ideally transit quickly through the fourth and fifth spool positions, since any transit delay in those positions slows the movement of the actuator, without providing functional purpose. As such, when the spool transits between the first and second spool positions (located respectively at the extreme ends of the spool travel), the mechanical dwell mechanism should dwell within the third position (i.e., the central region of spool travel), but transit quickly through the fourth and fifth positions (i.e., the dwell should be concentrated in the third position). Finally, in addition to concentrating the dwell within a subset of the travel between the first and second spool positions, a fourth design criterion is that the mechanical delay mechanism should ideally enable some ability to adjust the dwell time of the spool in the third position (i.e., the designer should be able to adjust the dwell time for a given application, for example from tens of milliseconds to hundreds of milliseconds). Thus, the designer should have the ability to adjust both the spatial and temporal characteristics of the dwell.

Exemplary embodiments of the mechanical delay mechanism described here can provide the aforementioned design characteristics. Specifically, the mechanism resides within the spool (i.e., in a similar manner to the way in which centering springs are located within the spool in a conventional double-solenoid three-position valve), and therefore the delay mechanism need not affect the spool/body interface. The mechanism leverages viscous fluid flow within the spool (similar to that found in a hydraulic damper), such that substantial material wear is avoided, and therefore the frictional (i.e., delay) characteristics are not expected to vary significantly over the cycle lifetime of the valve. The mechanism concentrates the transit delay within a specific geometric region of spool travel, such that the dwell occurs primarily in the region of the third position of the spool. And finally, variation of both the geometry of the mechanism and the viscosity of the hydraulic fluid enable adjustment in both the delay time and the delay region of operation, such that the essential temporal and spatial design characteristics can be selected for a given application.

Particular embodiments include a mechanism for implementing a delay in a directional control valve in the movement of a valve spool within a valve body from a first position of the spool to a second position of the spool.

Certain embodiments include a mechanism for implementing a delay in a directional control valve in the movement of a valve spool within a valve body from a first position of the spool to a second position of the spool through a third position of the spool, where the third position of the spool is located between the first and second positions. In specific embodiments, the valve spool transits between the first and third positions and between the second and third positions at a first velocity; the valve spool transits through the third position at a second velocity; and the first velocity is greater than the second velocity.

In certain embodiments, the mechanism is located within the spool. In particular embodiments, the mechanism is a fluid damping mechanism. In particular embodiments, the fluid is a hydraulic fluid. In specific embodiments, the fluid is a pneumatic fluid. In particular embodiments, the mechanism comprises a piston assembly, which remains fixed relative to a valve body, such that the valve spool moves over the piston assembly as it moves within the valve body. In certain embodiments, the piston assembly comprises a central piston, contiguous with smaller diameter piston rods, subsequently contiguous with larger diameter support rods. In specific embodiments, the spool contains a bore through the length of the spool. In certain embodiments, the spool bore contains at least one region in which the bore has a smaller diameter relative to the remainder of the bore. In particular embodiments, the region of smaller diameter is in the central portion of the spool. In specific embodiments, the region of smaller diameter in the bore overlaps the central piston as the spool moves through the region of the third spool position. In certain embodiments, the spool is actuated by an air pilot, where the pilot moves the spool through an annular piston that slides over a uniform section of the piston assembly. In particular embodiments, the spool is returned by an air return, where the air return moves the spool through an annular piston that slides over a uniform section of the piston assembly.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DESCRIPTION OF EXEMPLARY EMBODIMENTS

Figure 1:
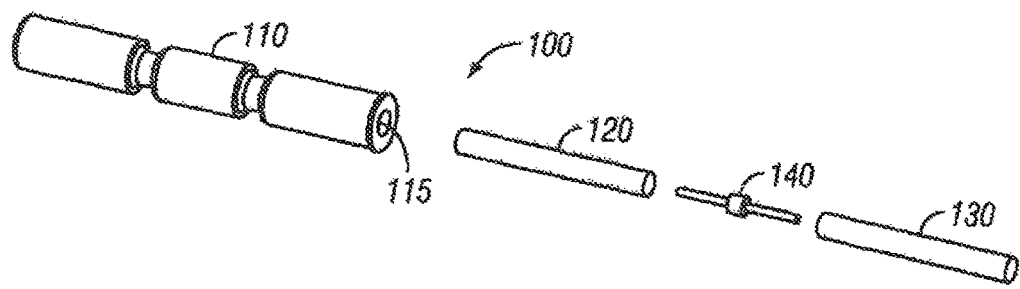
FIG. 1 depicts an exploded view of valve spool, support rods, and central piston.
Figure 2:
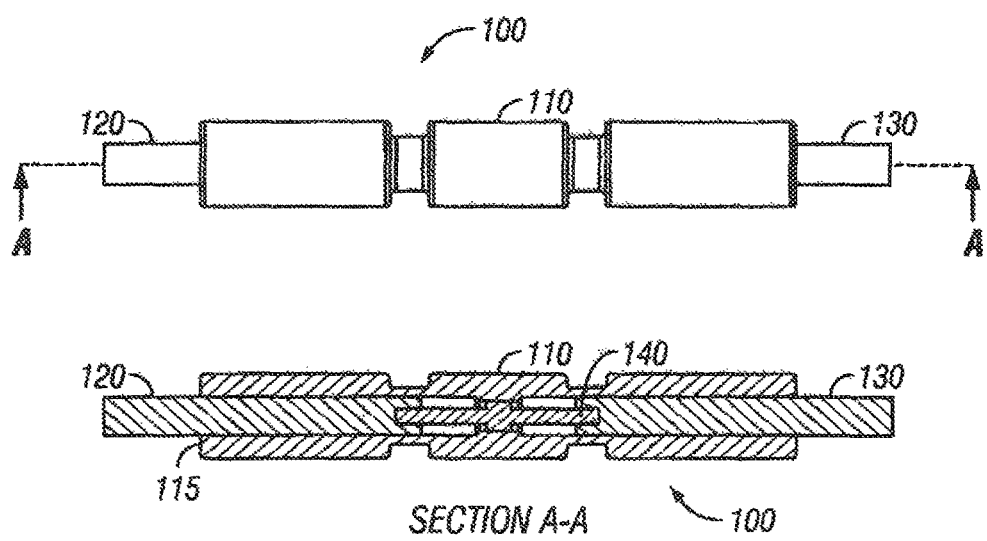
FIG. 2 depicts an assembly and cross-section view of assembled spool, support rod, and central piston assembly. The center section of the spool surrounding the central piston is filled with a hydraulic fluid.
Figure 3:
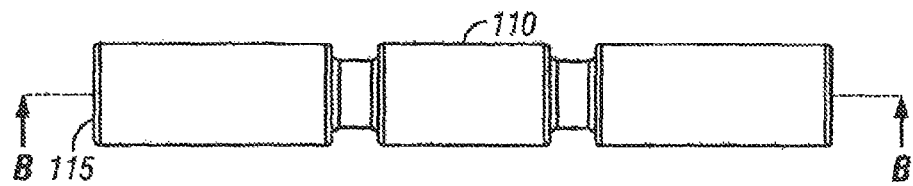
FIG. 3 depicts an assembly and cross-section view through valve spool, showing the reduced-diameter bore in the central region of the spool.
Figure 3:
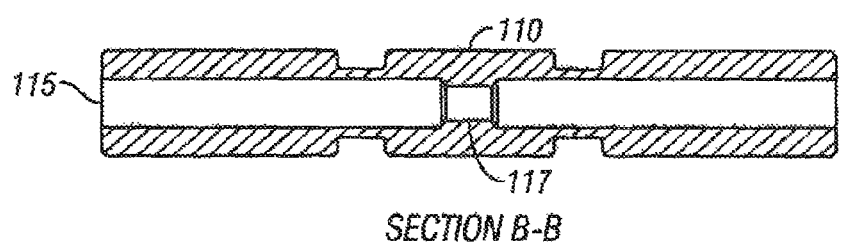
Figure 4:
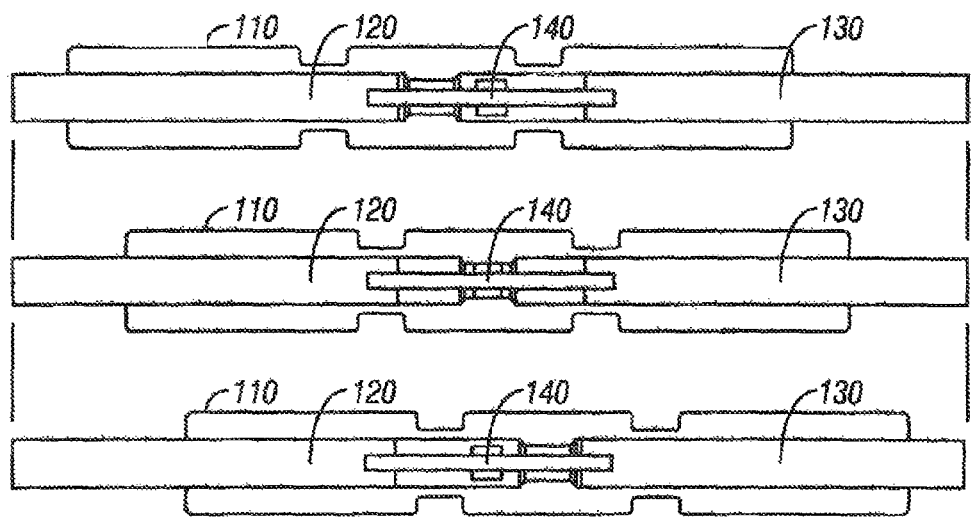
FIG. 4 depicts three cross-sectional views of valve spool, support rod, and central piston assembly, corresponding to the three primary spool positions. Specifically, the top view shows the spool in the first position (extreme left side of travel), the middle shows the spool in the third (central) position, and the bottom shows the spool in the second position (extreme right side of spool travel).

Exemplary embodiments of a mechanical dwell mechanism utilizing a hydraulic damping system located within the valve spool are illustrated in FIGS. 1 and 2. For purposes of clarity, not all components are labeled with reference numbers in each of the figures. Specifically, FIG. 1 shows an exploded view, and FIG. 2 a cross-section view, of a valve spool assembly 100, which specifically includes a valve spool 110, which contains a bore 115 through its center, a pair of support rods 120 and 130, and a central piston 140. Valve spool assembly 100 can be contained within a valve housing or body (not shown). In certain exemplary embodiments, valve spool assembly 100, support rods 120 and 130 and central piston 140 are trapped between two ends of the valve body, and therefore the rod/piston assembly remains fixed in space relative to the valve body, such that as spool 110 slides linearly within the valve body, it simultaneously travels over the assembly of support rods 120, 130 and central piston 140. Further, although not explicitly shown in the figure, in particular exemplary embodiments, the volume surrounding central piston 140 is filled with a hydraulic fluid, which is effectively sealed within this region by the respective sealing surfaces between support rods 120, 130 and spool bore 115. Other sealing elements, such as o-rings, can also be incorporated to enhance sealing. Further, as shown in FIG. 3, the central section of the spool contains a bore of smaller diameter than the bore in the remainder of the spool. The central region of smaller diameter bore is hereafter referred to as restriction 117. Since the resistance of fluid flow is generally inversely proportional to (the square of) the cross-sectional area of flow, and since this cross-sectional area is reduced substantially when the central section of the spool (with restriction 117) moves over central piston 140, the mechanical resistance to motion (as a result of the resistance to hydraulic fluid flow around the piston) increases considerably in this region of operation. When spool 110 is positioned away from this region (i.e., restriction 117 in spool 110 is away from central piston 140), the resistance to hydraulic fluid flow around piston 140 is small, and thus the mechanical resistance to motion is small. As such, if the respective lengths of central piston 140 and restriction 117 are designed such that their overlap corresponds to the region of third-position connectivity of spool 110, then spool 110 will dwell primarily in the region associated with the third position, and will move relatively quickly through the fourth and fifth regions of spool travel. FIG. 4 shows (from top to bottom) spool 110 and piston 140 assembly in the first, third (central), and second regions of spool travel, respectively. Note that the nature and characteristics of the mechanical delay can be shaped by changing the relative lengths and diameters of the central piston 140 and spool restriction 117, and also by changing the viscosity of the hydraulic fluid located within spool 110.

Figure 5:
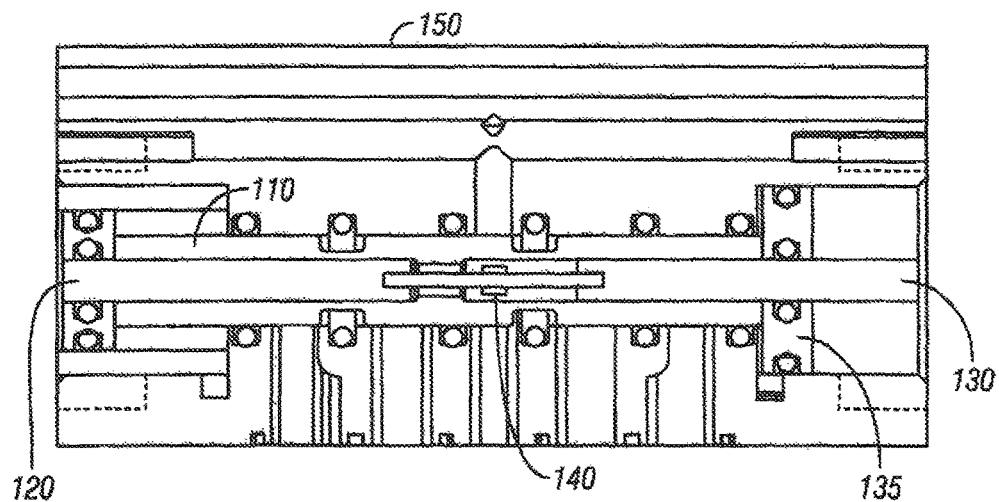
FIG. 5 depicts a cross-sectional view of directional control valve spool and body, with valve spool in the first position (i.e., at the extreme left end of spool travel). In this position, the first inlet port is in fluid communication with the first outlet port, and the second inlet port is in fluid communication with the second outlet port. In this position, the hydraulic piston of the mechanical delay mechanism is located in the large clearance section of the hydraulic damper, and therefore provides a small amount of resistance to linear motion.
Figure 6:
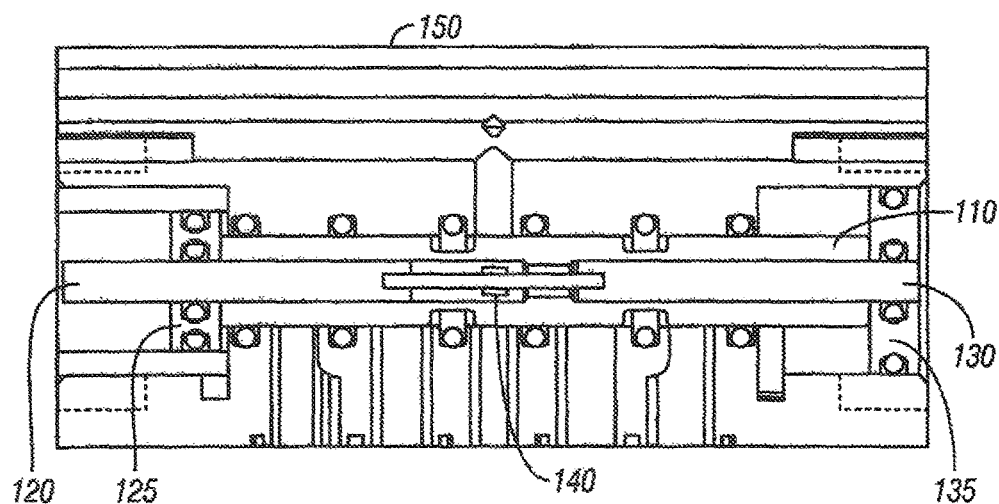
FIG. 6 depicts a cross-sectional view of directional control valve spool and body, with valve spool in the second position (i.e., at the extreme right end of spool travel). In this position, the first inlet port is in fluid communication with the second outlet port, and the second inlet port is in fluid communication with the first outlet port. In this position, the hydraulic piston of the mechanical delay mechanism is located in the large clearance section of the hydraulic damper, and therefore provides a small amount of resistance to linear motion.
Figure 7:
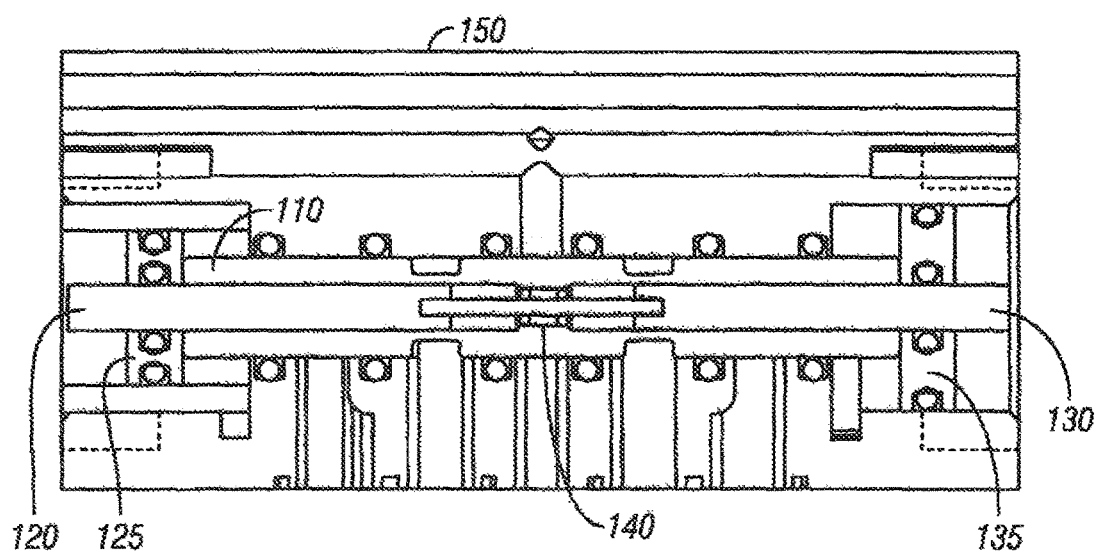
FIG. 7 depicts a cross-sectional view of directional control valve spool and body, with valve spool in the third position (i.e., in the central portion of spool travel). In this position, the hydraulic piston of the mechanical delay mechanism is located in the small clearance section of the hydraulic damper, thus presenting a large amount of resistance to linear motion.

Various methods can be utilized to move spool 110 over the assembly of support rods 120, 130 and piston 140. FIGS. 5 through 7 illustrate one method for doing so. Specifically, FIGS. 5 through 7 show a cross-section of valve spool 110 within a valve body 150, in each of the first, second, and third spool positions, respectively. In this assembly, spool 110 is moved from right to left (i.e., from the second to the first position) with a pilot-operated annular piston 135, which slides over support rod 130 in order to push spool 110. The spool in turn is moved from the left to right (i.e., from the first to the second position) with an air-return-operated annular piston 125, which slides over the left support rod in order to push the spool.

While exemplary embodiments are described herein, it will be understood that various modifications to the system, apparatus and methods can be made without departing from the scope of the present invention.

The invention claimed is:

1. A mechanism for implementing a delay in a directional control valve in the movement of a valve spool within a valve body from a first position of the spool to a second position of the spool through a third position of the spool, where the third position of the spool is located between the first and second positions, where:
   the valve spool transits between the first and third positions and between the second and third positions at a first velocity;
   the valve spool transits through the third position at a second velocity; and
   the first velocity is greater than the second velocity
   the mechanism is located within the spool;
   the mechanism is a fluid damping mechanism;
   the mechanism comprises a piston assembly, which remains fixed relative to a valve body, such that the valve spool moves over the piston assembly as it moves within the valve body;

the spool contains a bore through the length of the spool; and the spool bore contains at least one region in which the bore has a smaller diameter relative to the remainder of the bore.

2. The mechanism of claim 1, where the fluid is a hydraulic fluid.

3. The mechanism of claim 1, where the fluid is a pneumatic fluid.

4. The mechanism of claim 1, where the piston assembly comprises a central piston, contiguous with smaller diameter piston rods, subsequently contiguous with larger diameter support rods.

5. The mechanism of claim 1, where the region of smaller diameter is in the central portion of the spool.

6. The mechanism of claim 5, where the region of smaller diameter in the bore overlaps the central piston as the spool moves through the region of the third spool position.

7. The mechanism of claim 1, where the spool is actuated by an air pilot, where the pilot moves the spool through an annular piston that slides over a uniform section of the piston assembly.

8. The mechanism of claim 7, where the spool is returned by an air return, where the air return moves the spool through an annular piston that slides over a uniform section of the piston assembly.

* * * * *